United States Patent
Okawa et al.

(10) Patent No.: US 12,401,789 B2
(45) Date of Patent: *Aug. 26, 2025

(54) IMAGE ENCODING APPARATUS, IMAGE ENCODING METHOD, IMAGE DECODING APPARATUS, IMAGE DECODING METHOD, AND NON-TRANSITORY COMPUTER-READABLE STORAGE MEDIUM

(71) Applicant: CANON KABUSHIKI KAISHA, Tokyo (JP)

(72) Inventors: Koji Okawa, Tokyo (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,064

(22) Filed: May 6, 2024

(65) Prior Publication Data

US 2024/0291979 A1  Aug. 29, 2024

Related U.S. Application Data

(63) Continuation of application No. 18/067,570, filed on Dec. 16, 2022, now Pat. No. 12,015,773, which is a
(Continued)

(30) Foreign Application Priority Data

Dec. 17, 2018 (JP) ................ 2018-235911

(51) Int. Cl.
*H04N 19/117* (2014.01)
*H04N 19/176* (2014.01)
(Continued)

(52) U.S. Cl.
CPC ........ *H04N 19/117* (2014.11); *H04N 19/176* (2014.11); *H04N 19/186* (2014.11); *H04N 19/82* (2014.11)

(58) Field of Classification Search
CPC .. H04N 19/117; H04N 19/159; H04N 19/176; H04N 19/186; H04N 19/46; H04N 19/82; H04N 19/86
See application file for complete search history.

(56) References Cited

U.S. PATENT DOCUMENTS

| | | | |
|---|---|---|---|
| 2015/0208092 A1* | 7/2015 | Lee | H04N 19/463 375/240.18 |
| 2016/0135925 A1* | 5/2016 | Mason | A61C 7/002 703/2 |

(Continued)

FOREIGN PATENT DOCUMENTS

| | | |
|---|---|---|
| EP | 3833030 A1 | 6/2021 |
| JP | 2013229866 A | 11/2013 |
| JP | 7418152 B2 | 1/2024 |

*Primary Examiner* — Md N Haque
(74) *Attorney, Agent, or Firm* — Canon U.S.A., Inc. IP Division

(57) ABSTRACT

In prediction, one of a first mode for deriving, using pixels in an image including a target block, predicted pixels in the target block, a second mode for deriving the predicted pixels in the target block using pixels in an image different from the image including the target block, a third mode for generating the predicted pixels in the target block using both the pixels in the image including the target block and pixels in the different image can be used. If the third mode is used in at least one of the first and second blocks, the intensity of deblocking filter to be performed for the boundary between the first and second blocks is set to the same intensity as in a case in which the first mode is used in at least one of the first and second blocks.

14 Claims, 6 Drawing Sheets

Related U.S. Application Data continuation of application No. 17/347,357, filed on Jun. 14, 2021, now Pat. No. 11,570,433, which is a continuation of application No. PCT/JP2019/044115, filed on Nov. 11, 2019.

(51) Int. Cl.
 *H04N 19/186* (2014.01)
 *H04N 19/82* (2014.01)

(56) References Cited

U.S. PATENT DOCUMENTS

| | | | |
|---|---|---|---|
| 2017/0251213 A1* | 8/2017 | Ye | H04N 19/159 |
| 2019/0020851 A1* | 1/2019 | Abe | H04N 5/772 |
| 2019/0158886 A1* | 5/2019 | Narroschke | H04N 19/13 |
| 2021/0274223 A1* | 9/2021 | Lim | H04N 19/157 |
| 2022/0141458 A1* | 5/2022 | Sakurai | H04N 19/124 |
| | | | 375/240.02 |

* cited by examiner

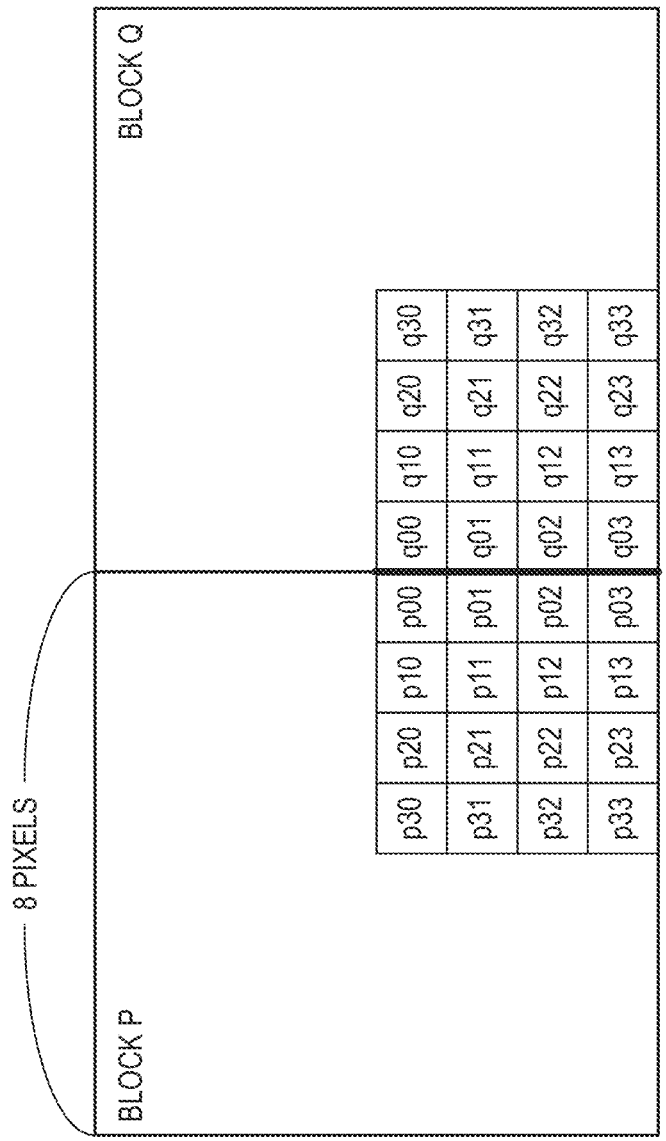

IMAGE ENCODING APPARATUS, IMAGE ENCODING METHOD, IMAGE DECODING APPARATUS, IMAGE DECODING METHOD, AND NON-TRANSITORY COMPUTER-READABLE STORAGE MEDIUM

CROSS-REFERENCE TO RELATED APPLICATIONS

This application is a Continuation of U.S. patent application Ser. No. 18/067,570, filed on Dec. 16, 2022, which is a Continuation of U.S. patent application Ser. No. 17/347,357, filed on Jun. 14, 2021, now issued as U.S. Pat. No. 11,570,433, on Jan. 31, 2023, which is a Continuation of International Patent Application No. PCT/JP2019/044115, filed on Nov. 11, 2019, which claims the benefit of Japanese Patent Application No. 2018-235911, filed on Dec. 17, 2018, both of which are hereby incorporated by reference herein in their entirety.

BACKGROUND OF THE INVENTION

Field of the Invention

The present invention relates to an image encoding technique and an image decoding technique.

Background Art

As an encoding method for moving image compression recording, an H.264/AVC encoding method (to be referred to as H.264 hereinafter) and an HEVC (High Efficiency Video Coding) encoding method (to be referred to as HEVC hereinafter) are known. In the HEVC, to improve the encoding efficiency, a basic block having a size larger than a conventional macro block (16 pixels×16 pixels) is employed. The basic block with the large size is called a CTU (Coding Tree Unit), and its size is 64 pixels×64 pixels at maximum. The CTU is further divided into sub-blocks each of which is a unit to perform prediction or conversion.

Also, in the HEVC, adaptive deblocking filter processing is performed for the block boundary of reconstructed images obtained by adding a signal of inverse quantizing/inverse converting processing and a predicted image, thereby suppressing a visually noticeable block distortion and preventing image quality degradation from propagating to the predicted image. PTL 1 discloses a technique concerning such deblocking filtering.

In recent years, actions have been launched to implement international standardization of an encoding method of a higher efficiency as a successor of the HEVC. JVET (Joint Video Experts Team) was founded between ISO/IEC and ITU-T, and standardization of a VVC (Versatile Video Coding) encoding method (to be referred to as VVC hereinafter) has been promoted. To improve the encoding efficiency, in addition to conventional intra-prediction and inter-prediction, a new prediction method (to be referred to as weighted intra-/inter-prediction hereinafter) using both intra-predicted pixels and inter-predicted pixels has been examined.

In the VVC as well, introduction of deblocking filtering has been examined, like the HEVC. Also, in the VVC, in addition to conventional intra-prediction and inter-prediction, introduction of weighted intra-/inter-prediction that generates a new predicted pixel using both intra-predicted pixels and inter-predicted pixels has been examined. In the HEVC, the deblocking filter intensity decision method is based on a prediction method such as intra-prediction/inter-prediction. On the other hand, in the weighted intra-/inter-prediction that is a new prediction method as well, the intensity of deblocking filter is decided by the same method as in inter-prediction. However, this cannot sufficiently suppress a distortion at a block boundary. The present invention provides a technique of appropriately deciding the intensity of deblocking filter processing for weighted intra-/inter-prediction and suppressing a distortion generated at a block boundary.

CITATION LIST

Patent Literature

PTL 1: Japanese Patent Laid-Open No. 2014-507863

SUMMARY OF THE INVENTION

According to the first aspect of the present invention, there is provided an image encoding apparatus comprising: an encoding unit configured to encode a sequence of images by performing prediction processing for each block; a decision unit configured to decide at least an intensity of deblocking filter processing to be performed for a boundary between a first block and a second block adjacent to the first block, based on a mode used in the prediction processing of the first block and a mode used in the prediction processing of the second block; and a processing unit configured to perform the deblocking filter processing for the boundary according to the intensity decided by the decision unit, wherein the encoding unit can use, in the prediction processing, one of: a first mode for deriving predicted pixels in a target block to be encoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the decision unit sets the intensity of the deblocking filter processing to be performed for the boundary between the first block and the second block to the same intensity as in a case in which the first mode is used in at least one of the first block and the second block.

According to the second aspect of the present invention, there is provided an image decoding apparatus for decoding encoded image data for each block, comprising: a decoding unit configured to decode an image by performing prediction processing for each block; a decision unit configured to decide at least an intensity of deblocking filter processing to be performed for a boundary between a first block and a second block adjacent to the first block, based on a mode used in the prediction processing of the first block and a mode used in the prediction processing of the second block; and a processing unit configured to perform the deblocking filter processing for the boundary according to the intensity decided by the decision unit, wherein the decoding unit can use, in the prediction processing, one of: a first mode for deriving predicted pixels in a target block to be decoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the decision unit sets the intensity of the deblocking filter processing to be performed for the boundary between the first block and the second block to the same intensity as in a case in which the first mode is used in at least one of the first block and the second block.

According to the third aspect of the present invention, there is provided an image encoding method comprising: encoding a sequence of images by performing prediction processing for each block; deciding at least an intensity of deblocking filter processing to be performed for a boundary between a first block and a second block adjacent to the first block, based on a mode used in the prediction processing of the first block and a mode used in the prediction processing of the second block; and performing the deblocking filter processing for the boundary according to the intensity decided in the deciding, wherein the encoding can use, in the prediction processing, one of: a first mode for deriving predicted pixels in a target block to be encoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the deciding sets the intensity of the deblocking filter processing to be performed for the boundary between the first block and the second block to the same intensity as in a case in which the first mode is used in at least one of the first block and the second block.

According to the fourth aspect of the present invention, there is provided an image decoding method for decoding encoded image data for each block, comprising: decoding an image by performing prediction processing for each block; deciding at least an intensity of deblocking filter processing to be performed for a boundary between a first block and a second block adjacent to the first block, based on a mode used in the prediction processing of the first block and a mode used in the prediction processing of the second block; and performing the deblocking filter processing for the boundary according to the intensity decided in the deciding, wherein the decoding can use, in the prediction processing, one of: a first mode for deriving predicted pixels in a target block to be decoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the deciding sets the intensity of the deblocking filter processing to be performed for the boundary between the first block and the second block to the same intensity as in a case in which the first mode is used in at least one of the first block and the second block.

According to the fifth aspect of the present invention, there is provided a non-transitory computer-readable storage medium for storing a computer program configured to cause a computer to function as: an encoding unit configured to encode a sequence of images by performing prediction processing for each block; a decision unit configured to decide at least an intensity of deblocking filter processing to be performed for a boundary between a first block and a second block adjacent to the first block, based on a mode used in the prediction processing of the first block and a mode used in the prediction processing of the second block; and a processing unit configured to perform the deblocking filter processing for the boundary according to the intensity decided by the decision unit, wherein the encoding unit can use, in the prediction processing, one of: a first mode for deriving predicted pixels in a target block to be encoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the decision unit sets the intensity of the deblocking filter processing to be performed for the boundary between the first block and the second block to the same intensity as in a case in which the first mode is used in at least one of the first block and the second block.

According to the sixth aspect of the present invention, there is provided a non-transitory computer-readable storage medium for storing a computer program configured to cause a computer to function as: a decoding unit configured to decode an image by performing prediction processing for each block; a decision unit configured to decide at least an intensity of deblocking filter processing to be performed for a boundary between a first block and a second block adjacent to the first block, based on a mode used in the prediction processing of the first block and a mode used in the prediction processing of the second block; and a processing unit configured to perform the deblocking filter processing for the boundary according to the intensity decided by the decision unit, wherein the decoding unit can use, in the prediction processing, one of: a first mode for deriving predicted pixels in a target block to be decoded, using pixels in an image including the target block; a second mode for deriving the predicted pixels in the target block using pixels in an image different from the image including the target block; and a third mode for generating the predicted pixels in the target block using both the pixels in the image including the target block and the pixels in the image different from the image including the target block, and wherein if the third mode is used in at least one of the first block and the second block, the decision unit sets the intensity of the deblocking filter processing to be performed for the boundary between the first block and the second block to the same intensity as in a case in which the first mode is used in at least one of the first block and the second block.

Further features of the present invention will become apparent from the following description of exemplary embodiments with reference to the attached drawings.

BRIEF DESCRIPTION OF THE DRAWINGS

FIG. 7 is a view showing an example of deblocking filter processing.

DESCRIPTION OF THE EMBODIMENTS

Figure 1:
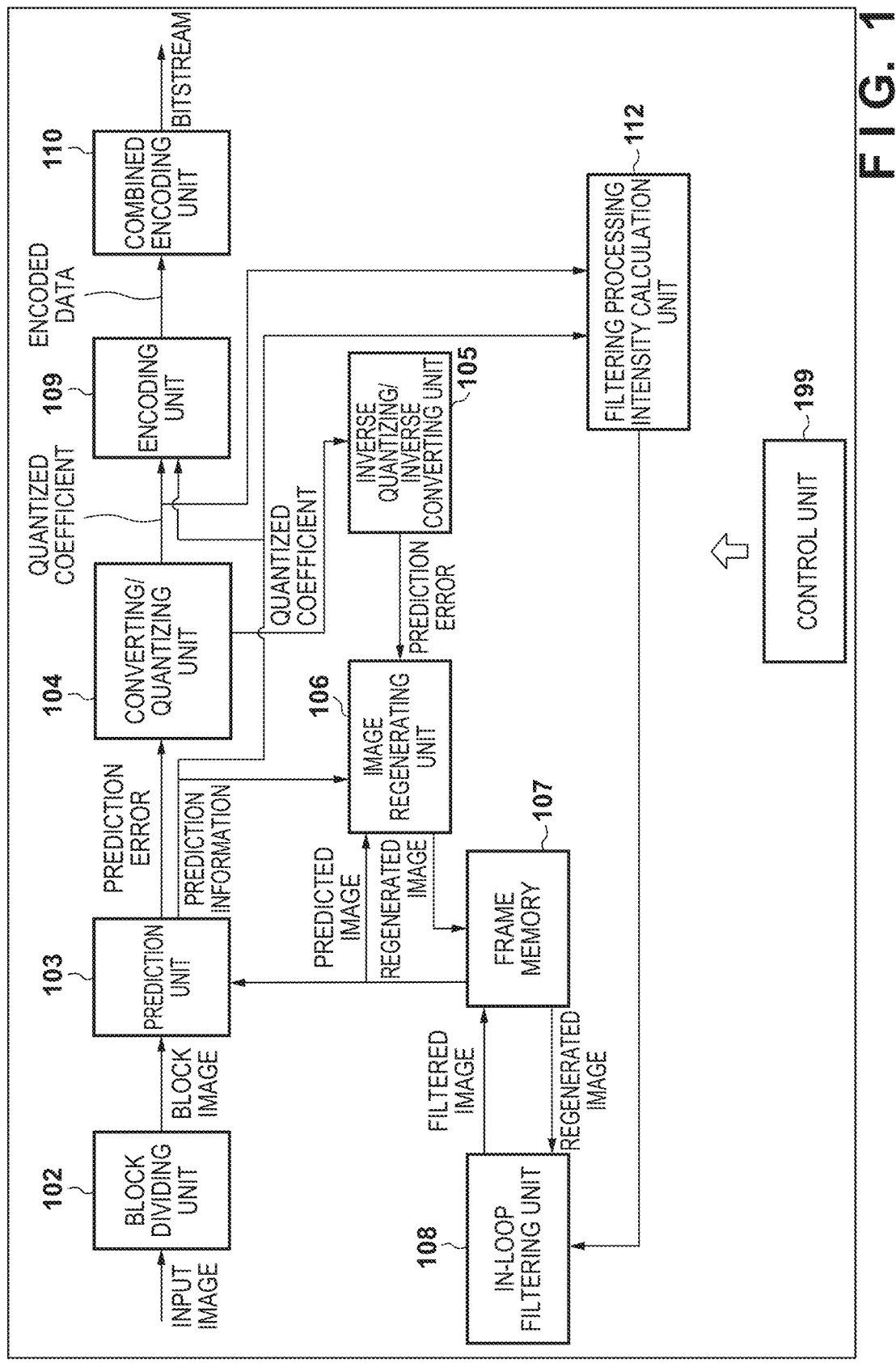
FIG. 1 is a block diagram showing an example of the functional configuration of an image encoding apparatus.

The embodiments of the present invention will now be described with reference to the accompanying drawings. Note that an embodiment to be described below shows an example when the present invention is implemented in detail, and is one of detailed embodiments of a configuration described in claims. For example, in the following explanation, terms such as "basic block" and "sub-block" are used. However, the embodiments can be applied to various processing units called "block" and "unit" in an image encoding technique.

First Embodiment

An example of the functional configuration of an image encoding apparatus according to this embodiment will be described first with reference to the block diagram of FIG. 1. A control unit 199 controls the operation of the entire image encoding apparatus. A block dividing unit 102 divides an input image (the image of each frame of a moving image, or a still image) into a plurality of basic blocks and outputs each basic block (divided image).

A prediction unit 103 divides each basic block into a plurality of sub-blocks (divided images). For each sub-block, the prediction unit 103 generates a predicted image by performing infra-frame prediction (intra-prediction), inter-frame prediction (inter-prediction), or weighted intra-/inter-prediction that adds weights to both intra-frame prediction and inter-frame prediction and combines these. Then, for each sub-block, the prediction unit 103 obtains the difference between the predicted image and the sub-block as a prediction error. Also, the prediction unit 103 generates, as prediction information, information representing how the basic block is divided into sub-blocks, the prediction mode, and information necessary for prediction such as a motion vector.

A converting/quantizing unit 104 performs orthogonal transformation of the prediction error of each sub-block, thereby obtaining transformation coefficients (orthogonal transformation coefficients) of each sub-block. The converting/quantizing unit 104 quantizes the transformation coefficients of each sub-block, thereby generating quantized coefficients of the sub-block.

An inverse quantizing/inverse converting unit 105 generates transformation coefficients by inversely quantizing the quantized coefficients of each sub-block generated by the converting/quantizing unit 104 using the quantization matrix used to quantize the sub-block, and performs inverse orthogonal transformation of the transformation coefficients, thereby generating a prediction error.

An image regenerating unit 106 generates, based on the prediction information generated by the prediction unit 103, a predicted image from the encoded image data stored in a frame memory 107, and regenerates an image from the predicted image and the prediction error generated by the inverse quantizing/inverse converting unit 105. The image regenerating unit 106 stores the regenerated image in the frame memory 107. The image data stored in the frame memory 107 is an image to be referred to by the prediction unit 103 when performing prediction (prediction processing) for the image of another frame.

An in-loop filtering unit 108 performs in-loop filtering processing such as deblocking filtering or sample adaptive offsetting for the image stored in the frame memory 107.

A filtering processing intensity calculation unit 112 calculates the intensity (bS value) of deblocking filter processing to be performed for the boundary between sub-blocks adjacent to each other using the prediction information output from the prediction unit 103 and the quantized coefficients output from the converting/quantizing unit 104.

One of two sub-blocks adjacent to each other will be referred to as a sub-block P, and the other as a sub-block Q. The bS value that is the intensity of deblocking filter processing performed for the boundary between the sub-block P and the sub-block Q is calculated in the following way.

If at least one of the sub-block P and the sub-block Q is a sub-block to which intra-prediction or weighted intra-/inter-prediction is applied, bS value=2.

If a nonzero orthogonal transformation coefficient exists in at least one of the sub-block P and the sub-block Q, bS value=1.

Otherwise, if the absolute value (magnitude) of the difference between a motion vector of the sub-block P and a motion vector of the sub-block Q is equal to or larger than a predetermined value (for example, one pixel or more), bS value=1.

Otherwise, if a reference image of motion compensation is different between the sub-block P and the sub-block Q, or if the number of motion vectors is different, bS value=1.

Otherwise, bS value=0.

Here, as the bS value becomes large, deblocking filter processing using deblocking filter of a higher intensity is performed. In this embodiment, when bS value=0, deblocking filter processing is not executed. When bS value=1, deblocking filter processing is executed only for luminance components. When bS value=2, deblocking filter processing is executed for luminance components and color difference components. That is, in this embodiment, the bS value represents whether to perform deblocking filter processing or represents the type of signals (image components) such as luminance components or color difference components as the target of the deblocking filter processing. However, the present invention is not limited to this. The number of types of deblocking filter processing intensity may be larger or smaller. The contents of processing according to the intensity of deblocking filter processing may also be different.

For example, the bS value may take values of five levels from 0 to 4, as in deblocking filter processing of H.264. In this embodiment, the intensity of deblocking filter processing for the boundary between sub-blocks using weighted intra-/inter-prediction has the same value as that when the sub-blocks use intra-prediction. This indicates that bS value=2, that is, the intensity is maximum. However, the embodiment is not limited to this. An intermediate bS value may be provided between bS value=1 and bS value=2 in this embodiment, and if at least one of the sub-block P and the sub-block Q uses weighted intra-/inter-prediction, the intermediate bS value may be used. In this case, deblocking filter processing similar to that in the normal case in which bS value=2 can be executed to luminance components, and deblocking filter processing whose intensity of a smoothing effect is lower than in a case in which bS value=2 can be executed for color difference components. This makes it possible to execute deblocking filter processing of an intermediate smoothing degree to the boundary between sub-blocks using weighted intra-/inter-prediction. The simple term "intensity of deblocking filter processing" as described above means changing the intensity of deblocking filter processing by changing a signal (a luminance component or a color difference component) as the target of deblocking filter processing or changing the intensity of the smoothing effect of correcting a signal by deblocking filter.

As described above, the intensity of deblocking filter processing to be performed for the boundary between adjacent blocks in a regenerated image (decoded image) stored in the frame memory 107 is decided based on information obtained in the process of predictive encoding of each block.

In this embodiment, deblocking filter is applied to an image region of 8 pixels×8 pixels including the boundary of sub-blocks, thereby implementing deblocking filter processing for the image region.

Deblocking filter processing performed by the in-loop filtering unit 108 will be described here in detail using an example shown in FIG. 7. In FIG. 7, the sub-block Q (block Q in FIG. 7) having a size of 8 pixels×8 pixels is adjacent to the right side of the sub-block P (block P in FIG. 7) having a size of 8 pixels×8 pixels. Here, deblocking filter processing is performed for the boundary portion (8 pixels (horizontal)×8 pixels (vertical) formed from 4 pixels (horizontal)×8 pixels (vertical) at the right end of the sub-block P and 4 pixels (horizontal)×8 pixels (vertical) at the left end of the sub-block Q) between the sub-block P and the sub-block Q. At this time, processing to be described below is performed for each of the upper half and the lower half of the boundary portion, thereby implementing deblocking filter processing for each of the upper half and the lower half. Here, the upper half of the boundary portion indicates a pixel region of 8 pixels (horizontal)×4 pixels (vertical) formed from 4 pixels (horizontal)×4 pixels (vertical) on the upper right side of the sub-block P and 4 pixels (horizontal)×4 pixels (vertical) on the upper left side of the sub-block Q. In addition, the lower half of the boundary portion indicates a pixel region of 8 pixels (horizontal)×4 pixels (vertical) formed from 4 pixels (horizontal)×4 pixels (vertical) on the lower right side of the sub-block P and 4 pixels (horizontal)×4 pixels (vertical) on the lower left side of the sub-block Q.

Deblocking filter processing for the lower half of the boundary portion will be described below. Deblocking filter processing to be described below is similarly applied to the upper half of the boundary portion.

Rectangles with p00 to p33 added in FIG. 7 represent pixels in the pixel region of 4 pixels (horizontal)×4 pixels (vertical) on the lower right side of the sub-block P, and p00 to p33 indicate pixel values. q00 to q33 in FIG. 7 represent pixels in the pixel region of 4 pixels (horizontal)×4 pixels (vertical) on the lower left side of the sub-block Q, and q00 to q33 indicate pixel values. First, concerning a luminance signal, if bS value ≥1, whether to perform filtering processing is determined using the following inequality.

$$|p20 - 2 \times p10 + p00| + |p23 - 2 \times p13 + p03| + |q20 - 2 \times q10 + q00| + |q23 - 2 \times q13 + q03| < \beta$$

where β is a value obtained from the average value of a quantization parameter of the sub-block P and a quantization parameter of the sub-block Q. Only when this inequality is satisfied, it is determined to perform deblocking filter processing. When deblocking filter processing is to be performed, it is determined next which one of strong filtering and weak filtering, which have different smoothing effects, is to be used. If all inequalities (1) to (6) to be shown below are satisfied, it is determined to use strong filtering having a high smoothing effect. Otherwise, it is determined to use weak filtering whose smoothing effect is weaker than strong filtering.

(1) $2 \times (|p20 - 2 \times p10 + p00| + |q20 - 2 \times q10 + q00|) < (\beta >> 2)$ (2) $2 \times (|p23 - 2 \times p13 + p03| + |q23 - 2 \times q13 + q03|) < (\beta >> 2)$ (3) $|p30 - p00| + |q00 - q30| < (\beta >> 3)$ (4) $|p33 - p03| + |q03 - q33| < (\beta >> 3)$ (5) $|p00 - q00| < ((5 \times tc + 1) >> 1)$ (6) $|p03 - q03| < ((5 \times tc + 1) >> 1)$ where >>N (N=1 to 3) means N-bit arithmetic right shift calculation, and tc is a value obtained from the bS value, the quantization parameter of the sub-block P, and the quantization parameter of the sub-block Q.

Letting p'0k, p'1k, p'2k, q'0k, q'1k, and q'2k (k=0 to 3) be pixels after filtering, strong filtering processing having a high smoothing effect for a luminance signal is represented by $$p'0k = \text{Clip3}(p0k - 2 \times tc, p0k + 2 \times tc,$$
$$(p2k + 2 \times p1k + 2 \times p0k + 2 \times q0k + q1k + 4) >> 3)$$

$$p'1k = \text{Clip3}(p1k - 2 \times tc, p1k + 2 \times tc, (p2k + p1k + p0k + q0k + 2) >> 2)$$

$$p'2k = \text{Clip3}(p2k - 2 \times tc, p2k + 2 \times tc,$$
$$(2 \times p3k + 3 \times p2k + p1k + p0k + q0k + 4) >> 3)$$

$$q'0k = \text{Clip3}(q0k - 2 \times tc, q0k + 2 \times tc,$$
$$(q2k + 2 \times q1k + 2 \times q0k + 2 \times p0k + p1k + 4) >> 3)$$

$$q'1k = \text{Clip3}(q1k - 2 \times tc, q1k + 2 \times tc, (q2k + q1k + q0k + p0k + 2) >> 2)$$

$$q'2k = \text{Clip3}$$
$$(q2k - 2 \times tc, q2k + 2 \times tc, (2 \times q3k + 3 \times q2k + q1k + q0k + p0k + 4) >> 3)$$

where Clip3(a, b, c) is a function for performing clip processing such that the range of c satisfies a≤b≤c. On the other hand, weak filtering processing having a low smoothing effect for a luminance signal is executed by $$\Delta = (9 \times (q0k - p0k) - 3 \times (q1k - p1k) + 8) >> 4$$

$$|\Delta| < 10 \times tc$$

If this inequality is not satisfied, deblocking filter processing is not executed. If the inequality is satisfied, processing to be described below is performed for the pixel value p0k and the pixel value q0k.

$$\Delta = \text{Clip3}(-tc, tc, \Delta)$$
$$p'0k = \text{Clip1}Y(p0k + \Delta)$$
$$q'0k = \text{Clip1}Y(q0k - \Delta)$$

where Clip1Y(a) is a function for performing clip processing such that the range of $\underline{a}$ satisfies 0≤a≤(a maximum value that can be expressed by the bit depth of a luminance signal). Also, if conditions represented by $$|p20 - 2 \times p10 + p00| + |p23 - 2 \times p13 + p03| < (\beta + (\beta >> 1)) >> 3)$$
$$|q20 - 2 \times q10 + q00| + |q23 - 2 \times q13 + q03| < (\beta + (\beta >> 1)) >> 3)$$

are satisfied, the following filtering processing is performed for p1k and q1k.

$$\Delta p = \text{Clip3}(-(tc >> 1), tc >> 1, (((p2k + p0k + 1) >> 1) - p1k + \Delta) >> 1)$$
$$p'1k = \text{Clip1}Y(p1k + \Delta p)$$
$$\Delta q = \text{Clip3}(-(tc >> 1), tc >> 1, (((q2k + q0k + 1) >> 1) - q1k + \Delta) >> 1)$$
$$q'1k = \text{Clip1}Y(q1k + \Delta q)$$

As for deblocking filter processing of a color difference signal, the following processing is performed only when bS value=2.

$$\Delta = \text{Clip3}(-tc, tc, ((((q0k - p0k) << 2) + p1k - q1k + 4) >> 3))$$
$$p'0k = \text{Clip1}C(p0k + \Delta)$$
$$p'0k = \text{Clip1}C(p0k - \Delta)$$

where Clip1C(a) is a function for performing clip processing such that the range of $\underline{a}$ satisfies 0≤a≤(a maximum value that can be expressed by the bit depth of a color difference signal). In this embodiment, the bS value representing the intensity of deblocking filter processing indicates the type of a signal as the target of deblocking filter processing, and additionally, a strong filter having a high smoothing effect and a weak filter having a low smoothing effect are selectively used in accordance with the condition of a pixel value. However, the present invention is not limited to this. For example, not only the type of the signal but also the intensity of the smoothing effect may be decided in accordance with the bS value. Alternatively, only the intensity of the smoothing effect may be decided based on the bS value, and the type of the signal may be decided based on another condition.

An encoding unit 109 encodes the quantized coefficients generated by the converting/quantizing unit 104 and the prediction information generated by the prediction unit 103, thereby generating encoded data. A combined encoding unit 110 generates a bitstream including the encoded data generated by the encoding unit 109 and header data including information necessary for decoding of an input image and outputs the bitstream.

The operation of the image encoding apparatus according to this embodiment will be described next. The block dividing unit 102 divides an input image into a plurality of basic blocks and outputs each of the divided basic blocks.

On a basic block basis, the prediction unit 103 divides the basic block into a plurality of sub-blocks (divided images). For each sub-block, the prediction unit 103 decides which one of the following prediction methods is to be used for encoding.

intra-prediction such as horizontal prediction or vertical prediction
  inter-prediction for performing motion compensation from a reference frame
  weighted intra-/inter-prediction that combines intra-prediction and inter-prediction The prediction methods used in this embodiment will be described anew. In intra-prediction, using encoded pixels spatially located around a block (encoding target block) as an encoding target, predicted pixels of the encoding target block are generated (derived), and an intra-prediction mode representing an intra-prediction method such as horizontal prediction, vertical prediction, or DC prediction is also generated.

In inter-prediction, using encoded pixels of a frame temporally different from the encoding target block, predicted pixels of the encoding target block are generated, and motion information representing a frame to be referred to, a motion vector, or the like is also generated.

In weighted intra-/inter-prediction, the pixel values of predicted pixels of the encoding target block are generated by obtaining the weighted average of the pixel values generated by the above-described intra-prediction and the pixel values generated by the above-described inter-prediction (using both). The pixel values of the predicted pixels are calculated using, for example, equation (1) below (an equation in a case in which the size of the basic block is 8 pixels×8 pixels).

$$p[x][y] = (w \times pInter[x][y] + (8 - w) \times pIntra[x][y]) >> 3) \qquad (1)$$

">>" represents a bit shift to the right. In equation (1), p[x][y] is the pixel value of a predicted pixel by weighted intra-/inter-prediction, which is calculated for coordinates (x, y) in the encoding target block. pInter[x][y] is the pixel value by inter-prediction for the coordinates (x, y) in the encoding target block, and pInter[x][y] is the pixel value by inter-prediction for the coordinates (x, y) in the encoding target block. w represents a weight value for the pixel values of inter-prediction and the pixel values of intra-prediction. In this embodiment, when w=4, weights for the pixel values of inter-prediction and the pixel values of intra-prediction become equal. In other words, if w>4, the weight for the pixel values of inter-prediction increases. If w<4, the weight for the pixel values of intra-prediction increases. The deciding method of the weight value is not particularly limited, and the weight value is decided in accordance with the size of a motion vector, the position of an encoding target block, and the like of the intra-prediction mode or inter-prediction. In weighted intra-/inter-prediction, the predicted pixels of the encoding target block are generated in this way, and the intra-prediction mode and motion information used to generate the predicted pixels are also generated.

The prediction unit 103 then generates a predicted image from the decided prediction method and encoded pixels, and generates a prediction error from the sub-block and the predicted image. The prediction unit 103 also generates, as prediction information, information representing how the basic block is divided into sub-blocks, the prediction mode, and information necessary for prediction such as a motion vector.

The converting/quantizing unit 104 performs orthogonal transformation of the prediction error of each sub-block, thereby generating transformation coefficients of each sub-block. The converting/quantizing unit 104 quantizes the transformation coefficients of each sub-block, thereby generating quantized coefficients of the sub-block.

The inverse quantizing/inverse converting unit 105 generates transformation coefficients by inversely quantizing the quantized coefficients of each sub-block generated by the converting/quantizing unit 104 using the quantization matrix used to quantize the sub-block, and performs inverse orthogonal transformation of the transformation coefficients, thereby generating a prediction error.

The image regenerating unit 106 generates, based on the prediction information generated by the prediction unit 103, a predicted image from the encoded image data stored in the frame memory 107, and regenerates an image from the predicted image and the prediction error generated by the inverse quantizing/inverse converting unit 105. The image regenerating unit 106 stores the regenerated image in the frame memory 107.

The filtering processing intensity calculation unit 112 calculates the intensity of deblocking filter processing to be performed for the boundary between sub-blocks adjacent to each other by performing the above-described processing using the prediction information output from the prediction unit 103 and the quantized coefficients output from the converting/quantizing unit 104.

The in-loop filtering unit 108 performs in-loop filtering processing such as deblocking filtering or sample adaptive offsetting for the image stored in the frame memory 107. Deblocking filter processing to be performed by the in-loop filtering unit 108 is based on the intensity obtained by the filtering processing intensity calculation unit 112.

The encoding unit 109 entropy-encodes the quantized coefficients generated by the converting/quantizing unit 104 and the prediction information generated by the prediction unit 103, thereby generating encoded data. The method of entropy encoding is not particularly designated, and Golomb coding, arithmetic coding, Huffman coding, or the like can be used.

The combined encoding unit 110 generates a bitstream by multiplexing the encoded data, header data, and the like generated by the encoding unit 109, and outputs the generated bitstream.

Figure 3:
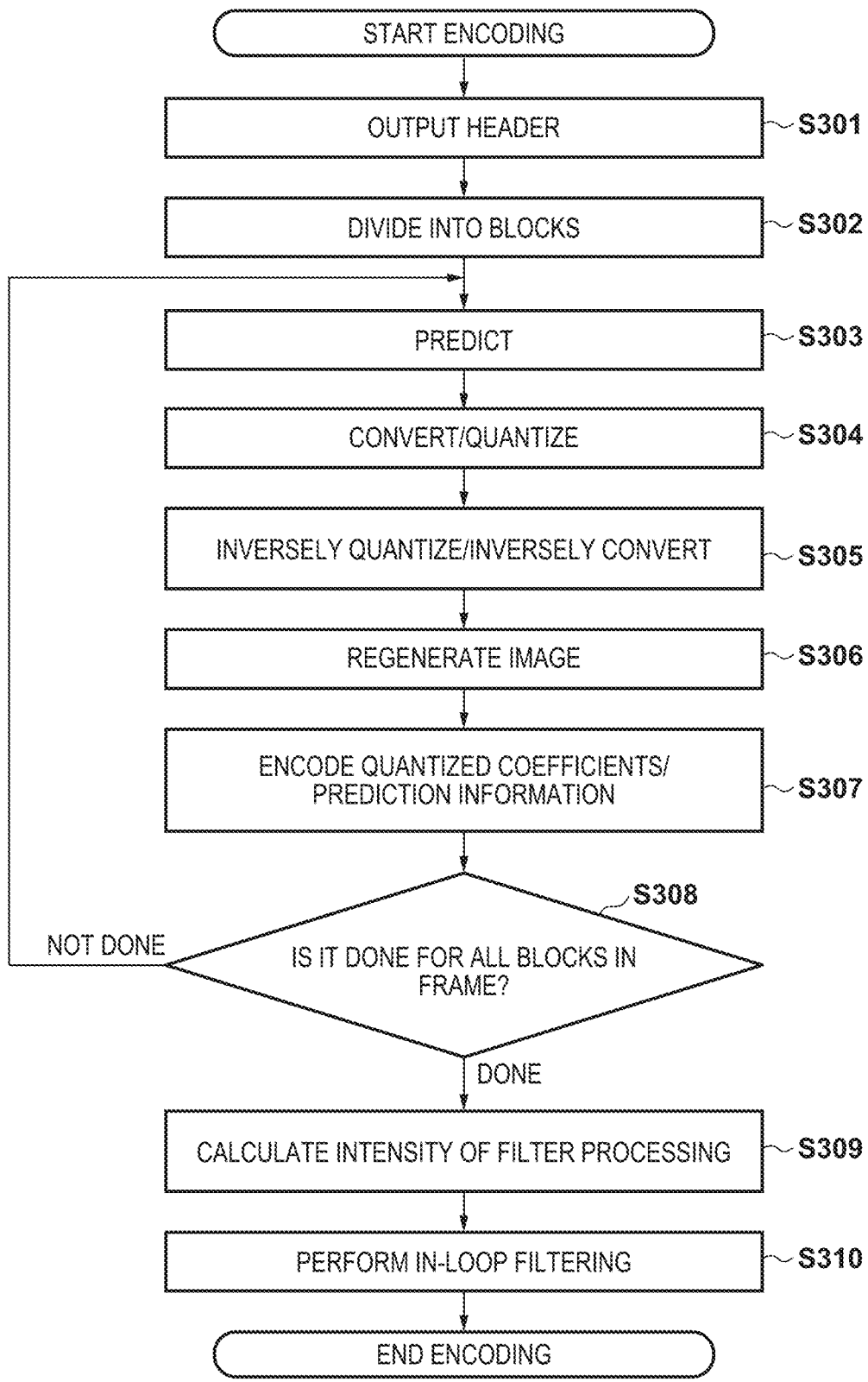
FIG. 3 is a flowchart of encoding processing.

Encoding processing of an input image by the above-described image encoding apparatus will be described with reference to the flowchart of FIG. 3. In step S301, the combined encoding unit 110 encodes a header necessary for encoding of an image, thereby generating header data (encoded data).

In step S302, the block dividing unit 102 divides an input image into a plurality of basic blocks. In step S303, the prediction unit 103 selects, as a selected basic block, an unselected one of the basic blocks divided in step S302. The prediction unit 103 decides a sub-block dividing method (in this embodiment, one prediction method out of intra-prediction, inter-prediction, and weighted intra-/inter-prediction), and divides the selected basic block into a plurality of sub-blocks in accordance with the decided sub-block dividing method. Also, the prediction unit 103 decides the prediction method on a sub-block basis. For each sub-block, the prediction unit 103 generates a predicted image by performing prediction in accordance with the decided prediction method using an image in the frame memory 107, and obtains the difference between the sub-block and the predicted image as a prediction error. Also, the prediction unit 103 generates, as prediction information, information representing the sub-block dividing method, the prediction mode, and information necessary for prediction such as a motion vector.

In step S304, the converting/quantizing unit 104 performs orthogonal transformation of the prediction error of each sub-block, thereby generating transformation coefficients of each sub-block. The converting/quantizing unit 104 quantizes the transformation coefficients of each sub-block, thereby generating quantized coefficients of the sub-block.

In step S305, the inverse quantizing/inverse converting unit 105 generates transformation coefficients by inversely quantizing the quantized coefficients of each sub-block generated in step S304 using the quantization matrix used to quantize the sub-block. Then, the inverse quantizing/inverse converting unit 105 performs inverse orthogonal transformation of the generated transformation coefficients, thereby generating a prediction error.

In step S306, the image regenerating unit 106 generates, based on the prediction information generated by the prediction unit 103, a predicted image from the encoded image data stored in the frame memory 107. Then, the image regenerating unit 106 regenerates an image from the predicted image and the prediction error generated by the inverse quantizing/inverse converting unit 105. The image regenerating unit 106 stores the regenerated image in the frame memory 107.

In step S307, the encoding unit 109 entropy-encodes the quantized coefficients generated by the converting/quantizing unit 104 and the prediction information generated by the prediction unit 103, thereby generating encoded data. The combined encoding unit 110 multiplexes the header data and the encoded data generated by the encoding unit 109, thereby generating a bitstream.

In step S308, the control unit 199 determines whether all basic blocks are encoded. As the result of the determination, if all basic blocks are encoded, the process advances to step S309. If an unencoded basic block remains, the process returns to step S303.

In step S309, the filtering processing intensity calculation unit 112 calculates the intensity of deblocking filter processing to be performed for the boundary between sub-blocks adjacent to each other by performing the above-described processing using the prediction information obtained by the prediction unit 103 and the quantized coefficients obtained by the converting/quantizing unit 104.

In step S310, the in-loop filtering unit 108 performs in-loop filtering processing such as deblocking filtering or sample adaptive offsetting for the image stored in the frame memory 107. Deblocking filter processing to be performed for the boundary between sub-blocks adjacent to each other is based on the intensity obtained for the boundary by the filtering processing intensity calculation unit 112.

As described above, according to this embodiment, particularly in step S309, deblocking filter having a high distortion correction effect can be set for the boundary between sub-blocks using weighted intra-/inter-prediction.

This can suppress a block distortion and improve subjective image quality. Also, since no new operation is needed for the calculation of the intensity of deblocking filter processing, the complexity of implementation is not increased.

Additionally, in this embodiment, the presence/absence of deblocking filter processing for the block boundary of luminance or color difference is changed depending on the intensity (bS value) of deblocking filter processing. However, the intensity of the smoothing effect of the filter itself may be changed by the intensity (bS value). For example, when the intensity (bS value) of deblocking filter processing is high, a filter having a longer tap length and a high correction effect can be used. When the intensity (bS value) of deblocking filter processing is low, a filter having a shorter tap length and a low correction effect can be used. This makes it possible to adjust the intensity of the filter, that is, the correction effect by a method other than the presence/absence of deblocking filter processing.

Second Embodiment

In the following embodiments including this embodiment, differences from the first embodiment will be described, and the rest is the same as in the first embodiment unless otherwise specified below. In this embodiment, an image encoding apparatus performs the following processing in accordance with the flowchart of FIG. 3.

Figure 6:
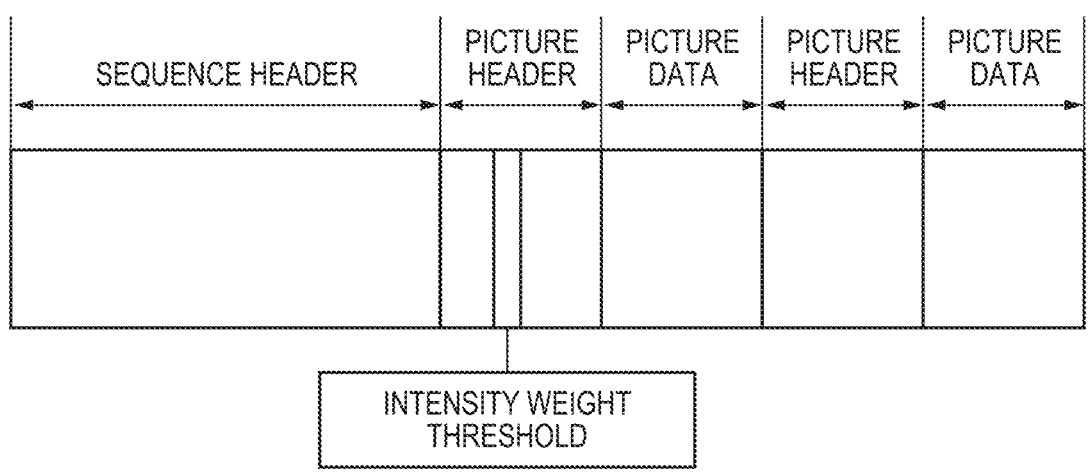
FIG. 6 is a view showing an example of the configuration of a bitstream.

FIG. 6 shows an example of the configuration of a bitstream according to this embodiment. A picture header stores filter_weight_threshold that is the weight threshold (intensity weight threshold) of the intensity of deblocking filter processing. This is a threshold for deciding, by a weight value w in weighted intra-/inter-prediction, whether a sub-block should be handled as a sub-block to which intra-prediction is applied or a sub-block to which inter-prediction is applied when calculating the bS value of the deblocking filter.

In step S309, a filtering processing intensity calculation unit 112 calculates a bS value. More specifically, if the following inequality holds, the bS value is calculated by handling a sub-block of weighted intra-/inter-prediction as a sub-block of intra-prediction.

w<filter_weight_threshold

For example, if the value of filter_weight_threshold is 4, all sub-blocks of weighted intra-/inter-prediction, which have a weight value w smaller than 4, are handled as sub-blocks of intra-prediction. All sub-blocks of weighted intra-/inter-prediction, which have a weight value w of 4 or more, are handled as sub-blocks of inter-prediction. The following table shows an example of bS values when a sub-block P and a sub-block Q shown in FIG. 7 are encoded by intra-prediction, inter-prediction, weighted intra-/inter-prediction (w=3), and weighted intra-/inter-prediction (w=5).

TABLE 1

Prediction Methods of Blocks P and Q and bS Values

| | | Block Q | | | |
|---|---|---|---|---|---|
| | | intra | inter | w = 3 | w = 5 |
| Block P | intra | 2 | 2 | 2 | 2 |
| | inter | 2 | 1 or less | 2 | 1 or less |
| | w = 3 | 2 | 2 | 2 | 2 |
| | w = 5 | 2 | 1 or less | 2 | 1 or less |

In this table, filter_weight_threshold=4. For example, if at least one of the sub-block P and the sub-block Q, which are adjacent, is encoded by intra-prediction or weighted intra-/inter-prediction (w=3), the one sub-block is handled as an intra-prediction block. Hence, the bS value is set to 2. If both the sub-block P and the sub-block Q are encoded by inter-prediction or weighted intra-/inter-prediction (w=5), both the sub-block P and the sub-block Q are handled as inter-prediction blocks. Hence, the bS value is set to 0 or 1. Whether to set the bS value to 0 or 1 is determined as in the filtering processing intensity calculation unit 112 according to the first embodiment. This is decided depending on the presence/absence of non-zero orthogonal transformation coefficients in the sub-block P and the sub-block Q, the difference in the number or size of motion vectors, the difference in the reference image, and the like.

The filtering processing intensity calculation unit 112 decides the bS value by referring to the data in the table. Note that in this embodiment, filter_weight_threshold is stored in the picture header. However, the storage destination is not limited to a specific storage destination, and filter_weight_threshold may be stored in, for example, the sequence header. Also, in this embodiment, the intensity weight threshold is stored in the header as information used to determine whether a sub-block of weighted intra-/inter-prediction should be handled as a sub-block of intra-prediction or a sub-block of inter-prediction when calculating the bS value. However, the present invention is not limited to this. Flag information representing that a sub-block should always be handled as a sub-block of intra-prediction may be stored, or flag information representing that a sub-block should always be handled as a sub-block of inter-prediction may be stored. Alternatively, a value obtained by subtracting 4 from the value of filter_weight_threshold in advance may be set as an intensity weight threshold filter_weight_threshold_minus4. Since the possibility that the value of filter_weight_threshold_minus4 is set to 0 or a value close to 0 becomes high, the code amount of information itself can be decreased by Golomb coding or the like.

As described above, according to this embodiment, it is possible to decide the intensity of deblocking filter processing for a sub-block of weighted intra-/inter-prediction without needing complex processing. In addition, the user can freely adjust the intensity of deblocking filter processing for a block of weighted intra-/inter-prediction.

Also, in this embodiment, information used to decide the intensity of the filter is output to the header. However, the present invention is not limited to this. Whether a sub-block of weighted intra-/inter-prediction should be handled as a sub-block of intra-prediction or a sub-block of inter-prediction may uniquely be decided in advance by the value w. Alternatively, deblocking filter that smooths strongly as the weight of intra-prediction becomes large may be applied independently of the bS value. Hence, a code amount corresponding to the intensity weight threshold can be saved, and implementation complexity can be lowered by fixing deblocking filter processing using the prediction mode.

Third Embodiment

In this embodiment, an image decoding apparatus that decodes an input image encoded by the image encoding apparatus according to the first embodiment will be described. An example of the functional configuration of the image decoding apparatus according to this embodiment will be described with reference to the block diagram of FIG. 2.

A control unit 299 controls the operation of the entire image decoding apparatus. A demultiplexing/decoding unit 202 acquires a bitstream generated by the image encoding apparatus, demultiplexes information concerning decoding processing and encoded data concerning coefficients from the bitstream, and decodes encoded data existing in the header of the bitstream. In this embodiment, the demultiplexing/decoding unit 202 performs an operation reverse to that of the above-described combined encoding unit 110.

A decoding unit 203 decodes the encoded data demultiplexed from the bitstream by the demultiplexing/decoding unit 202, thereby acquiring quantized coefficients and prediction information. An inverse quantizing/inverse converting unit 204 performs an operation similar to that of the inverse quantizing/inverse converting unit 105 provided in the above-described image encoding apparatus. The inverse quantizing/inverse converting unit 204 acquires transformation coefficients by inversely quantizing the quantized coefficients, and performs inverse orthogonal transformation for the transformation coefficients, thereby acquiring a prediction error.

An image regenerating unit 205 generates a predicted image by referring to an image stored in a frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206.

A filtering processing intensity calculation unit 209 decides a bS value that is the intensity of deblocking filter processing for the boundary between adjacent sub-blocks using the prediction information and the quantized coefficients decoded by the decoding unit 203, like the filtering processing intensity calculation unit 112.

An in-loop filtering unit 207 performs in-loop filtering processing such as deblocking filtering for the regenerated image stored in the frame memory 206, like the in-loop filtering unit 108. Deblocking filter processing by the in-loop filtering unit 207 is deblocking filter processing corresponding to the bS value obtained by the filtering processing intensity calculation unit 209.

The regenerated image stored in the frame memory 206 is appropriately output by the control unit 299. The output destination of the regenerated image is not limited to a specific output destination. For example, the regenerated image may be displayed on a display screen of a display device such as a display, or the regenerated image may be output to a projection apparatus such as a projector.

The operation (bitstream decoding processing) of the image decoding apparatus having the above-described configuration will be described next. In this embodiment, the bitstream input to the demultiplexing/decoding unit 202 is a bitstream of each frame of a moving image. However, it may be a bitstream of a still image.

The demultiplexing/decoding unit 202 acquires a bitstream of one frame generated by the image encoding apparatus, demultiplexes information concerning decoding processing and encoded data concerning coefficients from the bitstream, and decodes encoded data existing in the header of the bitstream. Also, the demultiplexing/decoding unit 202 outputs encoded data of each basic block of picture data to the decoding unit 203.

The decoding unit 203 decodes the encoded data demultiplexed from the bitstream by the demultiplexing/decoding unit 202, thereby acquiring quantized coefficients and prediction information. The prediction information includes information representing which one of the following prediction methods was used to encode each sub-block.

intra-prediction such as horizontal prediction or vertical prediction inter-prediction for performing motion compensation from a reference frame weighted intra-/inter-prediction that combines intra-prediction and inter-prediction The inverse quantizing/inverse converting unit 204 acquires transformation coefficients by inversely quantizing the quantized coefficients of each sub-block, and performs inverse orthogonal transformation for the transformation coefficients, thereby acquiring a prediction error.

The image regenerating unit 205 generates a predicted image by referring to an image stored in the frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206.

The filtering processing intensity calculation unit 209 decides a bS value that is the intensity of deblocking filter processing for the boundary between adjacent sub-blocks using the prediction information and the quantized coefficients decoded by the decoding unit 203, like the filtering processing intensity calculation unit 112.

The in-loop filtering unit 207 performs in-loop filtering processing such as deblocking filtering for the regenerated image stored in the frame memory 206, like the in-loop filtering unit 108. Deblocking filter processing by the in-loop filtering unit 207 is deblocking filter processing corresponding to the bS value obtained by the filtering processing intensity calculation unit 209.

In this embodiment, the bS value indicates the type of a signal (image component) as the processing target of the deblocking filtering, as in the first embodiment. Additionally, a strong filter having a high smoothing effect and a weak filter having a low smoothing effect are selectively used in accordance with the condition of a pixel value. However, the present invention is not limited to this. For example, not only the type of the signal but also the intensity of the smoothing effect may be decided in accordance with the bS value. Alternatively, only the intensity of the smoothing effect may be decided based on the bS value, and the type of the signal may be decided based on another condition.

Figure 4:
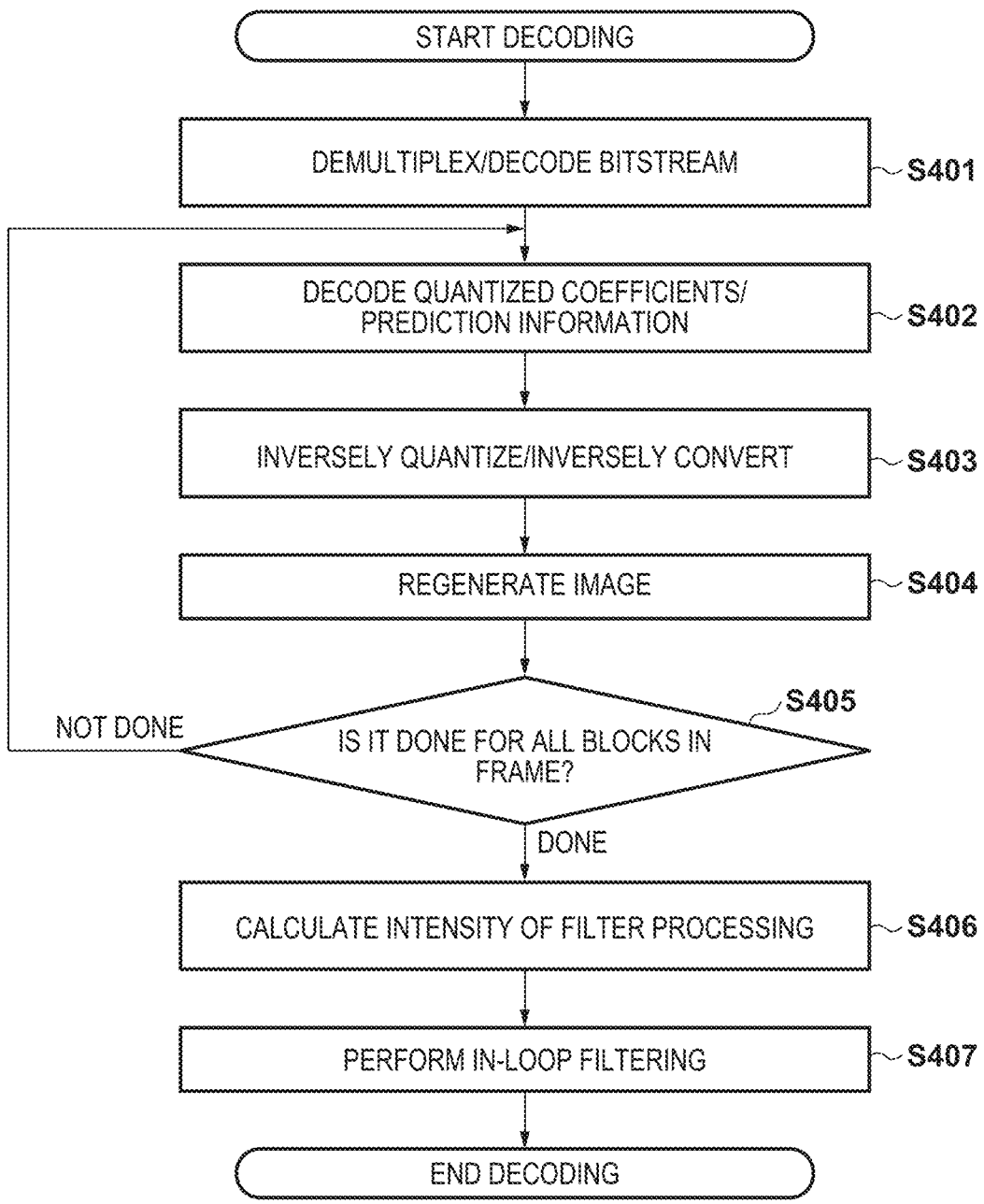
FIG. 4 is a flowchart of decoding processing.

Decoding processing of a bitstream corresponding to one frame by the image decoding apparatus described above will be described with reference to the flowchart of FIG. 4. In step S401, the demultiplexing/decoding unit 202 acquires a bitstream corresponding to one frame generated by the image encoding apparatus. The demultiplexing/decoding unit 202 then demultiplexes information concerning decoding processing and encoded data concerning coefficients from the bitstream, and decodes encoded data existing in the header of the bitstream.

Processes of steps S402 to S405 are performed for each basic block of the input image (in the image). In step S402, the decoding unit 203 decodes the encoded data demultiplexed from the bitstream by the demultiplexing/decoding unit 202, thereby acquiring quantized coefficients and prediction information.

In step S403, the inverse quantizing/inverse converting unit 204 acquires transformation coefficients by inversely quantizing the quantized coefficients of the sub-block as the decoding target, and performs inverse orthogonal transformation for the transformation coefficients, thereby acquiring a prediction error.

In step S404, the image regenerating unit 205 generates a predicted image by referring to an image stored in the frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206.

In step S405, the control unit 299 determines whether decoding of all basic blocks included in the bitstream is completed. As the result of the determination, if decoding of all basic blocks included in the bitstream is completed, the process advances to step S406. On the other hand, if a basic block whose decoding is not completed yet remains in all basic blocks included in the bitstream, the processing from step S402 is repeated for the basic block whose decoding is not completed yet.

In step S406, the filtering processing intensity calculation unit 209 decides a bS value that is the intensity of deblocking filter processing for the boundary between adjacent sub-blocks using the prediction information and the quantized coefficients decoded by the decoding unit 203, like the filtering processing intensity calculation unit 112.

In step S407, the in-loop filtering unit 207 performs in-loop filtering processing such as deblocking filtering for the regenerated image stored in the frame memory 206 in step S404, like the in-loop filtering unit 108. Deblocking filter processing by the in-loop filtering unit 207 is deblocking filter processing corresponding to the bS value obtained by the filtering processing intensity calculation unit 209 in step S406.

As described above, according to this embodiment, it is possible to decode a bitstream generated by the image encoding apparatus according to the first embodiment, in which an appropriate deblocking filter is applied to a sub-block encoded by weighted intra-/inter-prediction.

Additionally, in this embodiment, the presence/absence of a filter for the block boundary of luminance or color difference is changed depending on the intensity (bS value) of deblocking filter processing. However, the intensity of the smoothing effect of the filter itself may be changed by the intensity (bS value) of deblocking filter processing. For example, when the intensity (bS value) of deblocking filter processing is high, a filter having a longer tap length and a high correction effect can be used. When the intensity (bS value) of deblocking filter processing is low, a filter having a shorter tap length and a low correction effect can be used. This makes it possible to decode a bitstream for which the intensity of the filter, that is, the correction effect is adjusted by a method other than the presence/absence of a filter.

Fourth Embodiment

In this embodiment, an image decoding apparatus that decodes an input image encoded by the image encoding apparatus according to the second embodiment will be described. In this embodiment, in processing according to the flowchart of FIG. 4, the following points are different from the third embodiment.

In step S401, a demultiplexing/decoding unit 202 demultiplexes information concerning decoding processing and encoded data concerning coefficients from the bitstream shown in FIG. 6, and decodes encoded data existing in the header of the bitstream. In this decoding, filter_weight_threshold that is an intensity weight threshold in the picture header is decoded.

In step S406, a filtering processing intensity calculation unit 209 calculates a bS value. Note that in this embodiment, whether to set the bS value to 0 or 1 is determined as in the filtering processing intensity calculation unit 209 according to the third embodiment.

In this embodiment, filter_weight_threshold exists in the picture header. However, the present invention is not limited to this, and filter_weight_threshold may exist in, for example, the sequence header. Also, in this embodiment, the intensity weight threshold is decoded as information used to determine whether a block of weighted intra-/inter-prediction should be handled as a sub-block of intra-prediction or a sub-block of inter-prediction when calculating the bS value. However, the present invention is not limited to this. Flag information representing that a sub-block should always be handled as a sub-block of intra-prediction may be decoded, or flag information representing that a sub-block should always be handled as a sub-block of inter-prediction may be decoded. Alternatively, a value obtained by subtracting 4 from the value of filter_weight_threshold in advance may be decoded as an intensity weight threshold filter_weight_threshold_minus4. Since the possibility that the value of filter_weight_threshold_minus4 is set to 0 or a value close to 0 becomes high, a bitstream in which the code amount of information itself is small can be decoded.

As described above, according to this embodiment, it is possible to decide the intensity of deblocking filter processing for a sub-block of weighted intra-/inter-prediction without needing complex processing. In addition, it is possible to decode a bitstream for which the user has freely adjusted the intensity of deblocking filter processing for a sub-block of weighted intra-/inter-prediction.

Also, in this embodiment, information used to decide the intensity of the filter is decoded from the header. However, the present invention is not limited to this. Whether a sub-block of weighted intra-/inter-prediction should be handled as a sub-block of intra-prediction or a sub-block of inter-prediction may uniquely be decided in advance by the value w. Alternatively, deblocking filter that smooths strongly as the weight of intra-prediction becomes large may be applied independently of the bS value. Hence, a bitstream in which a code amount corresponding to the intensity weight threshold is saved can be decoded, and implementation complexity can be lowered by fixing deblocking filter processing using the prediction mode.

Fifth Embodiment

Figure 2:
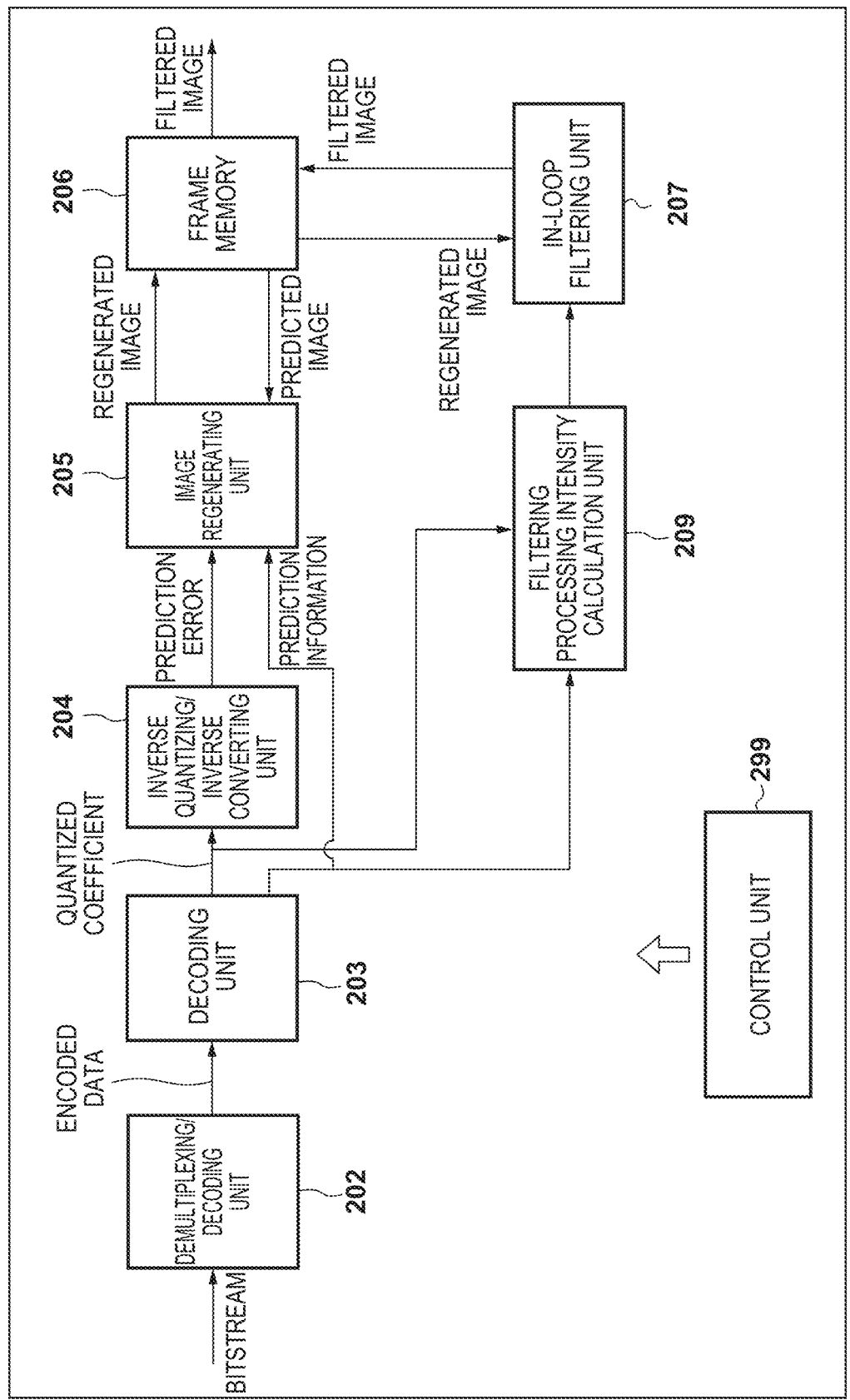
FIG. 2 is a block diagram showing an example of the functional configuration of an image decoding apparatus.

All the functional units shown in FIGS. 1 and 2 may be implemented by hardware, and some may be implemented by software (computer programs). In this case, a computer apparatus including the frame memory 107 or the frame memory 206 as a memory device and capable of executing the computer programs can be applied to the above-described image encoding apparatus or image decoding apparatus. An example of the hardware configuration of the computer apparatus applicable to the above-described image encoding apparatus or image decoding apparatus will be described with reference to the block diagram of FIG. 5.

A CPU 501 executes various kinds of processing using computer programs and data stored in a RAM 502 or a ROM 503. Accordingly, the CPU 501 performs operation control of the entire computer apparatus and executes or controls the processing described above as processing to be executed by the above-described image encoding apparatus or image decoding apparatus.

The RAM 502 has an area for storing computer programs and data loaded from the ROM 503 or an external storage device 506 and data (for example, the above-described data of a moving image or a still image) received from the outside via an I/F (interface) 507. The RAM 502 also has a work area used by the CPU 501 to execute various kinds of processing. The RAM 502 can thus appropriately provide various kinds of areas. The setting data and the activation program of the computer apparatus are stored in the ROM 503.

An operation unit 504 is a user interface such as a keyboard, a mouse, or a touch panel. By operating the operation unit 504, a user can input various kinds of instructions to the CPU 501.

A display unit 505 is formed by a liquid crystal screen or a touch panel screen and can display a result of processing by the CPU 501 as an image or characters. For example, a regenerated image decoded by the above-described image decoding apparatus may be displayed on the display unit 505. Note that the display unit 505 may be a projection apparatus such as a projector that projects an image or characters.

The external storage device 506 is a mass information storage device such as a hard disk drive. An OS (Operating System) and computer programs and data used to cause the CPU 501 to execute or control various kinds of processing described above as processing to be executed by the above-described image encoding apparatus or image decoding apparatus are stored in the external storage device 506. The computer programs stored in the external storage device 506 include a computer program used to cause the CPU 501 to implement the functions of functional units other than the above-described frame memory 107 and frame memory 206. Also, the data stored in the external storage device 506 includes various kinds of information necessary for encoding or decoding, such as what has been described above as already known information (an intensity weight threshold, data in Table 1, and the like).

The computer programs and data stored in the external storage device 506 are appropriately loaded into the RAM 502 under the control of the CPU 501 and processed by the CPU 501. Note that the above-described frame memory 107 or frame memory 206 can be implemented by a memory device such as the RAM 502 or the external storage device 506.

The I/F 507 functions as an interface configured to perform data communication with an external device. For example, a moving image or a still image can be acquired from an external server apparatus or image capturing apparatus to the RAM 502 or the external storage device 506 via the I/F 507.

Figure 5:
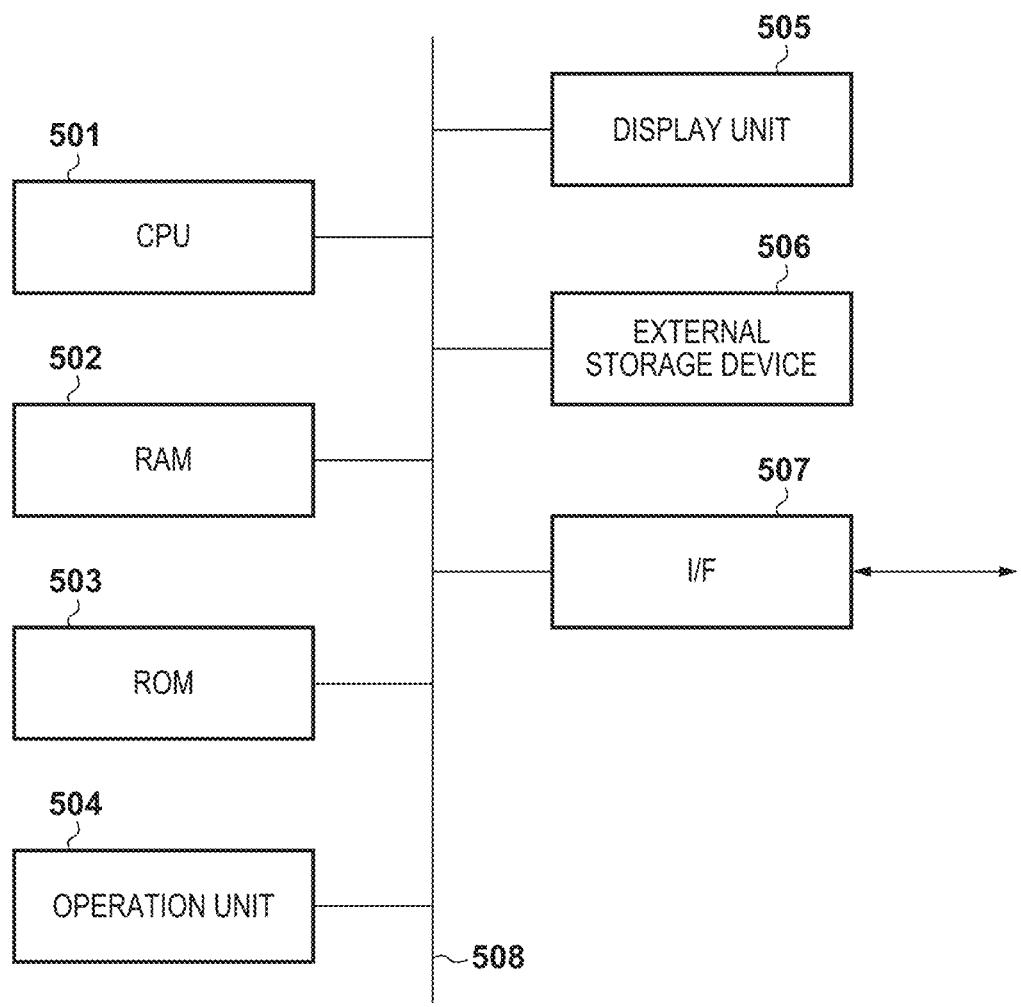
FIG. 5 is a block diagram showing an example of the hardware configuration of a computer apparatus.

The CPU 501, the RAM 502, the ROM 503, the operation unit 504, the display unit 505, the external storage device 506, and the I/F 507 are connected to a bus 508. Note that the configuration shown in FIG. 5 is merely an example of the hardware configuration of the computer apparatus applicable to the above-described image encoding apparatus or image decoding apparatus, and various changes/modifications can be made.

Sixth Embodiment

In the above-described embodiments, a sub-block is used as an encoding unit. However, the encoding unit is not limited to a sub-block, and, for example, a basic block may be used as an encoding unit. Also, the numerical values used in the above description are merely used to make a detailed description, and are not intended to limit the above-described embodiments to the used numerical values. For example, the value w, the value of the intensity weight threshold, and the size of a block used in the above description are merely examples, and are not limited to the above-described numerical values.

In the above-described embodiments, the image decoding apparatus has been described as an apparatus different from the image encoding apparatus. However, the image decoding apparatus and the image encoding apparatus may be combined into one apparatus. In this case, this apparatus can encode an input image and decode the encoded input image as needed.

Also, the target to which the deblocking filter is applied is not limited to the boundary between sub-blocks, and may be, for example, the boundary between transformation units. In the above-described embodiments, the size of the deblocking filter is 8 pixels×8 pixels. However, the size is not limited to this. The size of the transformation unit may be the same as the sub-block or may be different from the sub-block.

Some or all of the above-described embodiments may appropriately be used in combination. Alternatively, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the configuration of the present invention, it is possible to appropriately decide the intensity of deblocking filter processing for weighted intra-/inter-prediction and suppress a distortion generated at a block boundary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding apparatus comprising:
an encoding unit configured to encode an image by performing prediction processing for each block;
a decision unit configured to decide a bS value of deblocking filter processing to be performed for a boundary between a first block and a second block adjacent to the first block, based on at least one of a mode used in the prediction processing in the first block and a mode used in the prediction processing in the second block, wherein the bS value corresponds to a strength for the deblocking filter processing; and
a processing unit configured to perform the deblocking filter processing for the boundary based on a tc value derived by using a first quantization parameter of the first block, a second quantization parameter of the second block, and the bS value decided by the decision unit,
wherein in a case where a first mode is used in the prediction processing for a target block to be encoded, predicted pixels for the target block are derived by using pixels in an image including the target block,
wherein in a case where a second mode is used in the prediction processing for the target block, the predicted pixels for the target block are derived by using pixels in an image different from the image including the target block,
wherein in a case where a third mode is used in the prediction processing for the target block, the predicted pixels for the target block are derived by using both the pixels in the image including the target block and the pixels in the image different from the image including the target block,
wherein the bS value of the deblocking filter processing to be performed for the boundary between the first block and the second block in a case in which the third mode is used in the first block and the second mode is used in the second block is the same bS value as a bS value to be used in a case in which the third mode is used in the first block and the first mode is used in the second block,
wherein 2 is set as the bS value of the deblocking filter processing to be performed for the boundary between the first block and the second block in a case in which the first mode is used in the first block and the second mode is used in the second block, and
wherein the bS value of the deblocking filter processing to be performed for the boundary between the first block and the second block in a case in which the third mode is used in at least one of the first block and the second block is higher than a bS value to be used in a case in which the second mode is used in both of the first block and the second block.

2. The image encoding apparatus according to claim 1, wherein the processing unit performs the deblocking filter processing based on the tc value derived by using the first quantization parameter of the first block, the second quantization parameter of the second block, and the bS value by selecting a target component as a target of the deblocking filter processing from a luminance component and chroma components in the block in accordance with the bS value.

3. The image encoding apparatus according to claim 1, wherein the processing unit determines whether to perform the deblocking filter processing, based on a β value derived by using both of the first quantization parameter and the second quantization parameter, and wherein the processing unit performs the deblocking filter processing for the boundary in a case where it is determined to perform the deblocking filter processing.

4. The image encoding apparatus according to claim 3, wherein the β value is derived by using an average value of the first quantization parameter and the second quantization parameter.

5. The image encoding apparatus according to claim 1, wherein in a case where the third mode is used in the prediction processing for the target block, the predicted pixels for the target block are derived by using a weight value and using both the pixels in the image including the target block and the pixels in the image different from the image including the target block, the weight value being dependent on a position of the target block in the image including the target block.

6. An image decoding apparatus for decoding encoded image data for each block, comprising:
a decoding unit configured to decode an image by performing prediction processing for each block;
a decision unit configured to decide a bS value of deblocking filter processing to be performed for a boundary between a first block and a second block adjacent to the first block, based on at least one of a mode used in the prediction processing in the first block and a mode used in the prediction processing in the second block, wherein the bS value corresponds to a strength for the deblocking filter processing; and
a processing unit configured to perform the deblocking filter processing for the boundary based on a tc value derived by using a first quantization parameter of the first block, a second quantization parameter of the second block, and the bS value decided by the decision unit,
wherein in a case where a first mode is used in the prediction processing for a target block to be decoded, predicted pixels for the target block are derived by using pixels in an image including the target block,
wherein in a case where a second mode is used in the prediction processing for the target block, the predicted pixels for the target block are derived by using pixels in an image different from the image including the target block,
wherein in a case where a third mode is used in the prediction processing for the target block, the predicted pixels for the target block are generated by using both the pixels in the image including the target block and the pixels in the image different from the image including the target block,
wherein
the bS value of the deblocking filter processing to be performed for the boundary between the first block and the second block in a case in which the third mode is used in the first block and the second mode is used in the second block is the same bS value as a bS value to be used in a case in which the third mode is used in the first block and the first mode is used in the second block,
wherein 2 is set as the bS value of the deblocking filter processing to be performed for the boundary between the first block and the second block in a case in which the first mode is used in the first block and the second mode is used in the second block, and
wherein the bS value of the deblocking filter processing to be performed for the boundary between the first block and the second block in a case in which the third mode is used in at least one of the first block and the second block is higher than a bS value to be used in a case in which the second mode is used in both of the first block and the second block.

7. The image decoding apparatus according to claim 6, wherein the processing unit performs the deblocking filter processing based on the tc value derived by using the first quantization parameter of the first block, the second quantization parameter of the second block, and the bS value by selecting a target component as a target of the deblocking filter processing from a luminance component and chroma components in the block in accordance with the bS value.

8. The image decoding apparatus according to claim 6, wherein the processing unit determines whether to perform the deblocking filter processing, based on a β value derived by using both of the first quantization parameter and the second quantization parameter, and wherein the processing unit performs the deblocking filter processing for the boundary in a case where it is determined to perform the deblocking filter processing.

9. The image decoding apparatus according to claim 8, wherein the β value is derived by using an average value of the first quantization parameter and the second quantization parameter.

10. The image decoding apparatus according to claim 6, wherein in a case where the third mode is used in the prediction processing for the target block, the predicted pixels for the target block are derived by using a weight value and using both the pixels in the image including the target block and the pixels in the image different from the image including the target block, the weight value being dependent on a position of the target block in the image including the target block.

11. An image encoding method comprising:
encoding an image by performing prediction processing for each block;
deciding a bS value of deblocking filter processing to be performed for a boundary between a first block and a second block adjacent to the first block, based on at least one of a mode used in the prediction processing in the first block and a mode used in the prediction processing in the second block, wherein the bS value corresponds to a strength for the deblocking filter processing; and
performing the deblocking filter processing for the boundary based on a tc value derived by using a first quantization parameter of the first block, a second quantization parameter of the second block, and the bS value decided in the deciding,
wherein in a case where a first mode is used in the prediction processing for a target block to be encoded, predicted pixels for the target block are derived by using pixels in an image including the target block,
wherein in a case where a second mode is used in the prediction processing for the target block, the predicted pixels for the target block are derived by using pixels in an image different from the image including the target block,
wherein in a case where a third mode is used in the prediction processing for the target block, the predicted pixels for the target block are derived by using both the pixels in the image including the target block and the pixels in the image different from the image including the target block,
wherein the bS value of the deblocking filter processing to be performed for the boundary between the first block and the second block in a case in which the third mode is used in the first block and the second mode is used in the second block is the same bS value as a bS value to be used in a case in which the third mode is used in the first block and the first mode is used in the second block,
wherein 2 is set as the bS value of the deblocking filter processing to be performed for the boundary between the first block and the second block in a case in which the first mode is used in the first block and the second mode is used in the second block, and
wherein the bS value of the deblocking filter processing to be performed for the boundary between the first block and the second block in a case in which the third mode is used in at least one of the first block and the second block is higher than a bS value to be used in a case in which the second mode is used in both of the first block and the second block.

12. The image encoding method according to claim 11, wherein in a case where the third mode is used in the prediction processing for the target block, the predicted pixels for the target block are derived by using a weight value and using both the pixels in the image including the target block and the pixels in the image different from the image including the target block, the weight value being dependent on a position of the target block in the image including the target block.

13. An image decoding method for decoding encoded image data for each block, comprising:
decoding an image by performing prediction processing for each block;
deciding a bS value of deblocking filter processing to be performed for a boundary between a first block and a second block adjacent to the first block, based on at least one of a mode used in the prediction processing in the first block and a mode used in the prediction processing in the second block, wherein the bS value corresponds to a strength for the deblocking filter processing; and
performing the deblocking filter processing for the boundary based on a tc value derived by using a first quantization parameter of the first block, a second quantization parameter of the second block, and the bS value decided in the deciding,
wherein in a case where a first mode is used in the prediction processing for a target block to be decoded, predicted pixels for the target block are derived by using pixels in an image including the target block,
wherein in a case where a second mode is used in the prediction processing for the target block, the predicted pixels for the target block are derived by using pixels in an image different from the image including the target block,
wherein in a case where a third mode is used in the prediction processing for the target block, the predicted pixels for the target block are generated by using both the pixels in the image including the target block and the pixels in the image different from the image including the target block,
wherein the bS value of the deblocking filter processing to be performed for the boundary between the first block and the second block in a case in which the third mode is used in the first block and the second mode is used in the second block is the same bS value as a bS value to be used in a case in which the third mode is used in the first block and the first mode is used in the second block, wherein 2 is set as the bS value of the deblocking filter processing to be performed for the boundary between the first block and the second block in a case in which the first mode is used in the first block and the second mode is used in the second block, and wherein the bS value of the deblocking filter processing to be performed for the boundary between the first block and the second block in a case in which the third mode is used in at least one of the first block and the second block is higher than a bS value to be used in a case in which the second mode is used in both of the first block and the second block.

14. The image decoding method according to claim 13, wherein in a case where the third mode is used in the prediction processing for the target block, the predicted pixels for the target block are derived by using a weight value and using both the pixels in the image including the target block and the pixels in the image different from the image including the target block, the weight value being dependent on a position of the target block in the image including the target block.

* * * * *